May 5, 1964
E. D. McCALLA
3,132,207
MICROPHONE AMPLIFIER
Filed May 26, 1958
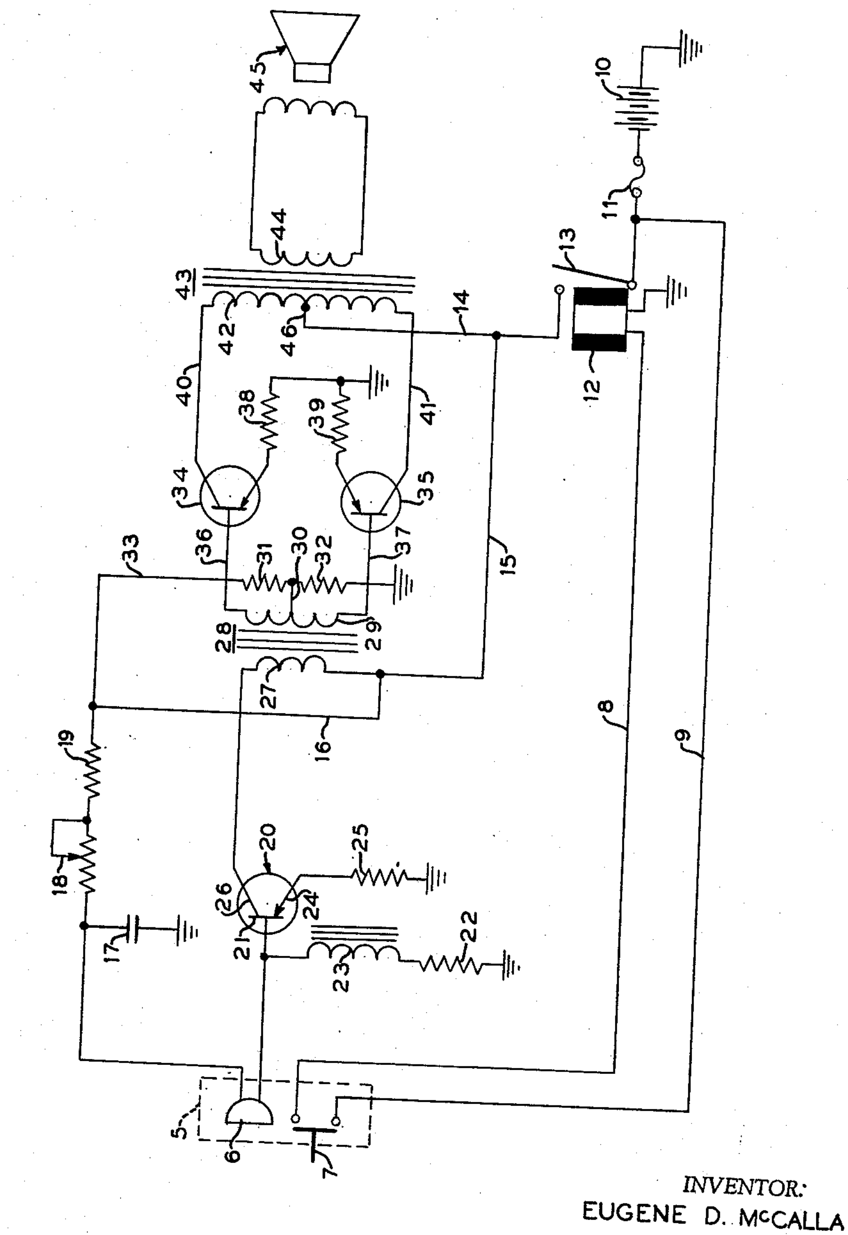
INVENTOR:
EUGENE D. McCALLA
BY: [signature]
ATTORNEY 3,132,207

MICROPHONE AMPLIFIER

Eugene D. McCalla, Smyrna, Ga., assignor to Electratone, Incorporated, Atlanta, Ga., a corporation of Georgia Filed May 26, 1958, Ser. No. 737,713
5 Claims. (Cl. 179—1)

This invention relates to a microphone amplifier, and more particularly concerns a microphone amplifier utilizing a variable resistance transducer, such as a carbon microphone, and a semi-conductor device, such as a transistor.

Heretofore, in order to insure class A operation in a transistor amplifier coupled with a transducer, the quiescent collector current in the transistor would have to be preset at a sufficiently high level so that no clipping in the collector would occur with maximum base signal input from the transducer. Consequently, for low signal level operation in such circuits, more collector current is flowing than is actually required to preclude cut-off distortion.

It is one of the objects of this invention, therefore, to provide a new and improved transducer-amplifier coupling arrangement which permits simultaneous control of signal level from a variable resistance transducer and the bias level of its associated input transistor in such manner as to maintain class A operation over a wide range of signal input levels with a minimum quiescent collector current.

Another object of this invention is to provide a new and improved coupling of a variable resistance transducer with a common emitter type of transistor amplifier, wherein the transducer is directly coupled to the base of the transistor so as to eliminate the need for coupling transformers and capacitors.

A further object of my invention is to provide a new and improved microphone amplifier combination in which collector current of the transistor amplifier is controlled in accordance with signal input level so as to minimize battery drain.

Another object of this invention is to provide a new and improved microphone amplifier which lends itself admirably for use in electronic megaphones, portable public address systems and audio modulators for mobile transmitters.

Still another object of this invention is to provide a new and improved microphone amplifier which utilizes a minimum number of parts at a minimum weight so as to be well adapted to meet the demands of economic manufacture.

Other objects and advantages of my invention will become apparent from consideration of the following description made in conjunction with the accompanying drawing in which the figure is a schematic representation of the preferred embodiment of microphone amplifier according to my invention as utilized in a public address system or electronic megaphone.

Referring now particularly to the drawing, that form of the invention therein shown includes casing 5 having variable resistance transducer 6 and pushbutton "on-off" switch 7 therein. Actuation of the switch 7 shorts out lines 8 and 9, thereby completing a circuit through fuse 11 to the line relay 12 from the battery 10, the positive side of which is grounded. Energization of relay 12 completes the circuit from the negative side of battery 10 through fuse 11 and line relay armature 13 to provide operating current through conductors 14 and 15 to the stages of my circuit.

Variable resistance transducer 6, which may be in the form of a carbon microphone, is energized from battery 10 through line relay armature 13, conductors 15 and 16, and through the coupling circuit including capacitor 17, rheostat 18 and resistor 19. Rheostat 18 serves to adjust the voltage across carbon microphone 6 as well as to adjust a biasing current on the base of the transistor 20 in the preamplifier stage, as will hereinafter be seen. Resistor 19 serves to limit the voltage across carbon microphone 6 when rheostat 18 is turned to its position of minimum resistance, as well as to provide still some decoupling in cooperation with capacitor 17, as is well understood by those skilled in the art.

The carbon microphone 6 is directly coupled to the base 21 of transistor 20. The base 21 is further connected to ground through biasing resistor 22 in series with audio choke 23, the latter providing a relatively high impedance at audio frequencies so as to prevent attenuation of the input signal from carbon microphone 6 to base 21. It is recognized, however, that this resistance could also be included as part of the resistance of the choke coil, or alternatively, a thermistor may be used instead. Emitter 24 of transistor 20 is likewise connected to ground through biasing resistor 25 which further functions to limit emitter current under changing conditions of temperature. If desired, a shunting capacitor could be used with resistor 25 to reduce degeneration.

Collector 26 of transistor 20 is connected through the primary winding 27 of output transformer 28 to the battery 10 through conductor 15 and relay armature 13. The secondary winding 29 of impedance transformer 28 is center tapped at 30 for connection to the junction of voltage dividing resistor 31 and 32 which are connected across the battery 10 through conductors 33, 16 and 15, the relative value of these resistors being such as to provide for a slight forward bias in the output stage to prevent cross-over distortion. The secondary of impedance matching transformer 28 couples the audio signals into a conventional common emitter type, push-pull power amplifier, including transistors 34 and 35 connected respectively to conductors 36 and 37 which connect to the secondary 29 of impedance transformer 28 on either side of the center tap. The emitters of transistors 34 and 35 are connected to ground through biasing resistors 38 and 39, respectively, which stabilize the transistors so as to prevent thermal runaway. The collectors of transistors 34 and 35 are connected through conductors 40 and 41 across the primary 42 of output transformer 43, the secondary winding 44 of which effects impedance matching with a conventional speaker system generally designated at 45. Power is supplied to the push-pull power amplifier through center tap 46 of output transformer 43 from conductor 14 which is in circuit with battery 10 through line relay armature 13.

Considering more fully the operation of the above described circuit, it will be seen that the carbon microphone 6 functions in conventional manner, with its resistance varying at a rate corresponding to the audio signal input thereto, so as to amplitude modulate the quiescent base current to the transistor 20.

The biasing of transistor 20 is determined by the base to emitter voltage which, in the circuit being described, is on the order of a few tenths of a volt. The base 21 is biased above ground by resistor 22, which condition because of low impedance would greatly attenuate the input signal except that audio choke 23 effectively isolates the audio signal from ground. The amplitude of input signal which is applied to base 21 of transistor 20 depends both on the amplitude of the audio signal into the transducing carbon microphone 6 and also the voltage across the microphone which, of course, determines the current therethrough. It should be evident, then, that the quiescent operating point of the transistor 20, as well as the voltage across carbon microphone 6, can be preset by adjusting the resistance of rheostat 18, the arrangement being such that the rheostat 18 and carbon microphone 6 are in series with inductor 23 and resistor 22 in a voltage divider arrangement across battery 10. Since the transistor is connected in common emitter configuration, it amplifies this base current variation to the effect that the collector current varies from its quiescent operating point as a function both of the gain of the transistor and its base current variation. The decoupling circuit 17, 18 and 19 makes the amplitude of biasing current to the base of the transistor independent of the internal resistance of the battery and lead wires and, in addition, prevents positive feedback of the push-pull output stage from causing oscillations.

Such biasing arrangement has been devised to have a particular advantage. Normally, in order to insure class A operation the quiescent collector current would have to be preset at a sufficiently high level so that with maximum base signal input no clipping in the collector would occur. Consequently, in low signal level operation more collector current is flowing than is actually required for class A operation. With the biasing arrangement that is provided in this circuit, however, biasing level is varied as the signal level is varied by means of volume control rheostat 18, so that for low signal operation the biasing current to the base is decreased, thereby reducing quiescent collector current but still maintaining class A operation. Of course, for large signal operation, the collector current is commensurately increased.

It can be seen also that the foregoing circuit arrangement has the distinct advantage that battery current is conserved, which of course is an extremely desirable feature, especially in portable operations. Another outstanding feature is the advantage obtained from operating at lowest possible collector current under high temperature conditions so as to prolong transistor life and minimize the possibility of thermal runaway.

Typical values for components to produce 10 watts of output power in the circuit shown would be as follows:

| | |
|---|---|
| Resistor **19** | 220 ohms. |
| Resistor **22** | 10 ohms. |
| Resistor **25** | 10 ohms. |
| Resistor **31** | 330 ohms. |
| Resistor **32** | 5 ohms. |
| Resistor **38** | .3 ohm. |
| Resistor **39** | .3 ohm. |
| Rheostat **18** | 3000 ohms. |
| Capacitor **17** | 500 microfarads. |
| Inductor **23** | 160 millihenrys. |
| Transistor **20** | 2N257 (PNP). |
| Transistor **34** | 2N257 (PNP). |
| Transistor **35** | 2N257 (PNP). |
| Transformer **28** | Primary 100 ohms, secondary 100 ohms ct. |
| Carbon microphone **6** | 100 ohms. |
| Battery **10** | 12 volts. |

From the foregoing, it will be apparent that I have provided a novel and improved microphone amplifier which is well adapted to fulfill the forestated objects of the invention. Moreover, whereas the invention has been disclosed in detail with respect to a preferred embodiment thereof which gives satisfactory results, it will be understood by those skilled in the art to which the invention most nearly appertains, that additional embodiments and methods may be provided without departing from the spirit or scope of the invention as defined by the appended claims.

I claim:

1. In a microphone amplifier for use with a source of current having high and low sides, a transistor being connected in common-emitter configuration with said source of current, a voltage divider being connected across said source of current, said divider having first and second arms, said first arm including a variable resistor and a variable resistance transducer in series with each other and connected to said high side, said second arm including an impedance component and connected to said low side, said voltage divider connected to the input of said transistor intermediate said first and second arms, said impedance component including inductive and resistive parameters.

2. Apparatus as set forth in claim 1 wherein said variable resistance transducer is a carbon microphone.

3. In a microphone amplifier having a source of current, a circuit for controlling microphone signal input level and amplifier bias level simultaneously including, a transistor amplifier connected in common-emitter configuration, a voltage divider having first and second arms, said first arm being connected to said source and including a carbon microphone and a variable resistor, said second arm being connected to said source and including an impedance component, said voltage divider connected to the input of said transistor intermediate said first and second arms, said impedance component including both inductive and resistive parameters.

4. In a microphone amplifier for use with a source of current, a transistor having emitter, collector, and base electrodes, a load impedance, said collector electrode being connected to one side of said source of current through said load impedance, said emitter electrode being connected to the other side of said source of current, a voltage divider having first and second arms, said first arm being connected to one side of said source of current, said second arm adapted to be connected to said other side of said source of current, said first arm including a variable resistor and a variable resistance transducer, said second arm including inductive and resistance component, said base electrode connected to said voltage divider intermediate said first and second arms, said variable resistor being adjustable for controlling both the signal input level from said variable resistance transducer and the bias level of said transistor.

5. In a microphone amplifier having a source of current, a first circuit across a source of current, a second circuit in parallel with said first circuit across said source of current, a transistor amplifier in said first circuit in common emitter configuration with respect to said source of current, output means in series with said amplifier, a voltage divider having first and second arms in series in said second circuit, a transducer in said first arm, a variable resistor in said first arm in series with said transducer, said first arm and the collector of said transistor amplifier being connected to the same side of said source of current, a coil in said second arm, a resistor in series with said coil in said second arm, said second arm and the emitter of said transistor amplifier being connected to the same side of said source of current, and a third circuit from said second circuit to the base of said transistor amplifier, said third circuit being connected to said second circuit between said first arm and said second arm, said resistor and said coil being of sufficient inductive and reactive impedance to impart a suitable bias level to said base and stabilize said transistor amplifier, said variable resistor being movable for simultaneously controlling both the signal input level of said transducer and the bias level of said amplifier.

References Cited in the file of this patent

UNITED STATES PATENTS

| | | |
|---|---|---|
| 2,762,870 | Sziklai | Sept. 11, 1956 |
| 2,784,262 | Crow | Mar. 5, 1957 |
| 2,807,665 | Perlman | Sept. 24, 1957 |
| 2,824,177 | Tado | Feb. 18, 1958 |
| 2,857,462 | Lin | Oct. 21, 1958 |
| 2,976,369 | Salzer | Mar. 21, 1961 |

FOREIGN PATENTS

| | | |
|---|---|---|
| 204,099 | Australia | Sept. 10, 1956 |